US011697386B1

(12) United States Patent
Gould et al.

(10) Patent No.: US 11,697,386 B1
(45) Date of Patent: Jul. 11, 2023

(54) FRONTAL OCCUPANT PROTECTION FROM DISPLAY SCREEN

(71) Applicant: ZF Passive Safety Systems US Inc., Washington, MI (US)

(72) Inventors: Douglas Gould, Lake Orion, MI (US); Gabriela Diaz, Sterling Heights, MI (US); David Varcoe, Bruce Township, MI (US); Navin Chopra, Shelby Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/580,885

(22) Filed: Jan. 21, 2022

(51) Int. Cl.
*B60R 21/206* (2011.01)
*B60R 21/2338* (2011.01)
*B60R 21/231* (2011.01)
*B60R 21/237* (2006.01)
*B60R 21/00* (2006.01)

(52) U.S. Cl.
CPC .......... *B60R 21/206* (2013.01); *B60R 21/231* (2013.01); *B60R 21/237* (2013.01); *B60R 21/2338* (2013.01); *B60R 2021/0004* (2013.01); *B60R 2021/23169* (2013.01); *B60R 2021/23382* (2013.01)

(58) Field of Classification Search
CPC . B60R 21/206; B60R 21/2338; B60R 21/231; B60R 21/237; B60R 21/205; B60R 2021/23382; B60R 2021/0004; B60R 2021/23169; B60R 2021/0051; B60R 2021/0053

USPC ................ 280/730.2, 730.1, 743.2
See application file for complete search history.

(56) References Cited

U.S. PATENT DOCUMENTS

| 2006/0232050 A1* | 10/2006 | Kumagai | B60R 21/231 |
| | | | 280/732 |
| 2012/0025496 A1* | 2/2012 | Schneider | B60R 21/231 |
| | | | 29/428 |
| 2018/0244234 A1* | 8/2018 | Anae | B60R 21/2338 |

FOREIGN PATENT DOCUMENTS

| FR | 3047701 A1 * | 8/2017 | B60K 37/04 |
| FR | 3056504 A1 * | 3/2018 | B60R 11/0241 |
| JP | 2000280845 A * | 10/2000 | B60R 11/0241 |

* cited by examiner

*Primary Examiner* — Keith J Frisby
(74) *Attorney, Agent, or Firm* — Tarolli, Sundheim, Covell & Tummino L.L.P.

(57) ABSTRACT

An apparatus helps to protect an occupant of a seat of a vehicle including an instrument panel and a display screen that is positioned rearward of an occupant facing surface of the instrument panel and that extends vertically above an upper surface of the instrument panel. The apparatus includes an airbag configured to have a stored condition in which the airbag is rolled and/or folded and positioned within the instrument panel at a location below the display screen. The airbag is configured to inflate and deploy from the instrument panel in response to receiving inflation fluid from an inflation fluid source. The airbag is configured to deploy in an upward direction through a space between the occupant and the instrument panel to a position in which the airbag is positioned between the display screen and the occupant.

15 Claims, 6 Drawing Sheets

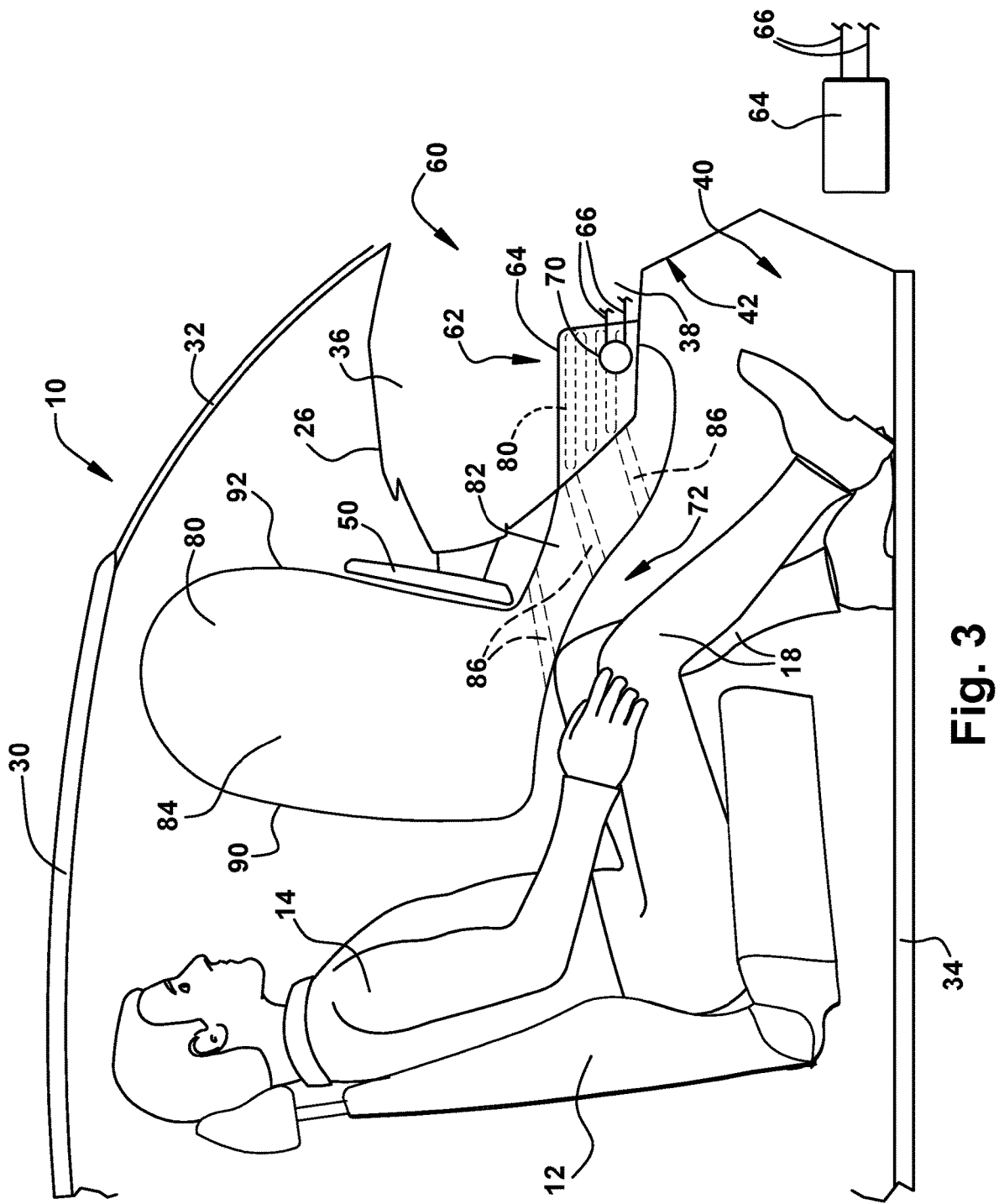

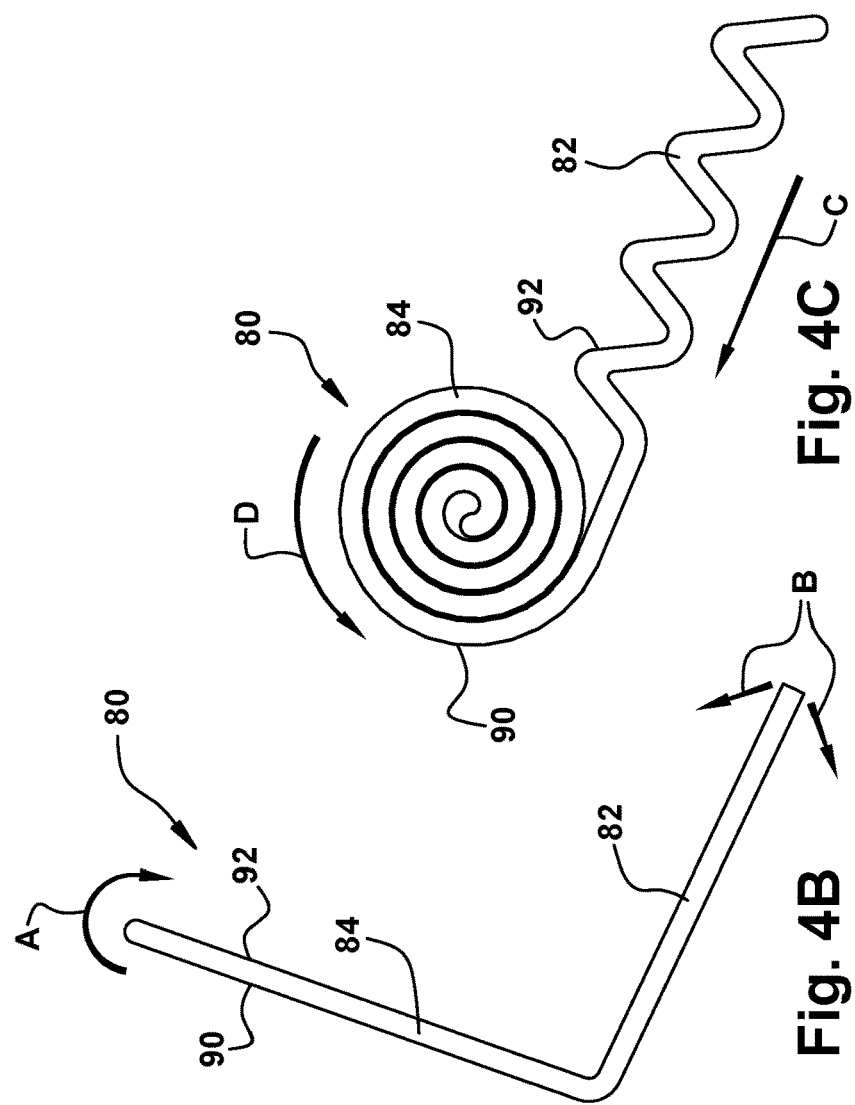
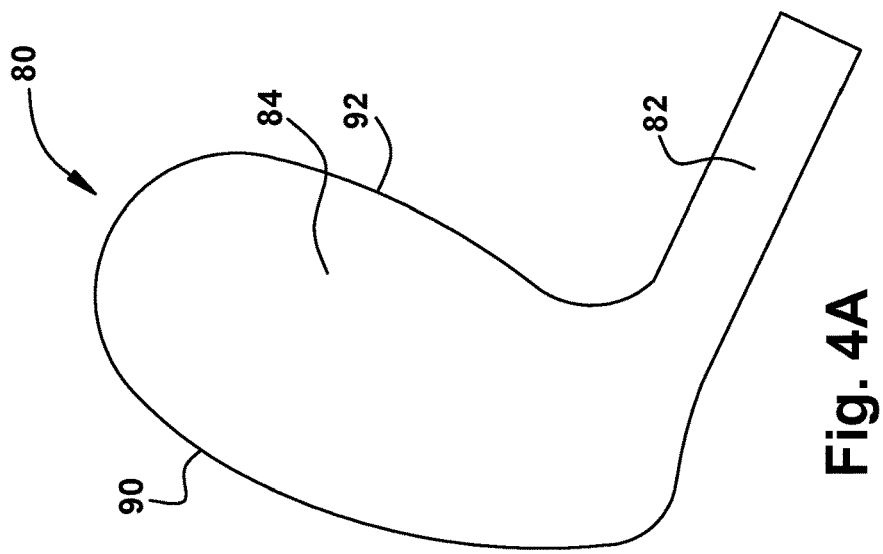
Fig. 4A  Fig. 4B  Fig. 4C

FRONTAL OCCUPANT PROTECTION FROM DISPLAY SCREEN

TECHNICAL FIELD

This disclosure relates to vehicle safety systems. More particularly, the disclosure relates to an apparatus for helping to protect an occupant of a vehicle upon the occurrence of an event, such as a vehicle collision. The apparatus includes a frontal airbag module configured to protect non-driver front seat occupants from impacts with a display screen.

BACKGROUND

The automobile industry is trending toward vehicles with autonomous driving features, with purely autonomous, i.e., "driverless" vehicles on the horizon. Driver instrumentation and controls are evolving along with this trend. As automation becomes increasingly prevalent, the need for traditional driver instrumentation and control arrangements changes and/or becomes diminished. Along with this, traditional passenger arrangements in the vehicle also evolve.

In the area of instrumentation and vehicle controls, vehicles are shifting more and more toward interactive display screens as the primary or sole operator interface for the vehicle, replacing knobs, switches and pushbuttons that were traditionally mounted on the instrument panel or center console. Interactive display screens can even replace the traditionally control components, such as gear shifters, parking brake actuators, window controls, door lock controls, mirror controls, etc.

As a result of this shift, the interactive display screen has become a prominent feature in the vehicle, not only for the vehicle driver/operator, but also for passengers, who routinely access some of these controls. Because interactive display screens are becoming the information and control center for the vehicle, their size and position in the vehicle is becoming more prominent. In some vehicles, large screens, such as 17-inch screens, 21-inch screens, or larger (measured diagonally) are mounted centrally on the instrument panel. While these large rectangular screens typically have been positioned in the portrait orientation (i.e., long dimension vertical), some vehicles are shifting to a landscape orientation (i.e., long dimension horizontal). Along with this evolution, instrument panel-mounted large display screens on the passenger side of the vehicle are not far off.

The implementation of large, instrument panel-mounted interactive display screens presents new challenges in regard to vehicle safety systems. Because the display screens are interactive, i.e., touchscreens, they need to be reachable by vehicle occupants. Center-mounted screens need to be reached by both the driver and passenger, and passenger side-mounted screens need to be reached by the passengers. Additionally, because display screen controls can eliminate the need for center console controls, the center console can be eliminated, thus presenting the possibility of a front row, center seat occupant that the vehicle safety must account for.

Furthermore, because the display screens depend on being reached via touch and on being viewed by the passengers in the cabin space, their positions in the vehicle are important. As a result, the display screens can be positioned rearward of the instrument panel, toward the occupants, to meet reach requirements. The display screens can also be positioned so that they extend vertically above the upper surface of the instrument panel. Accordingly, the vehicle safety system must account for the presence of this structure.

SUMMARY

A passenger airbag module is configured for installation in an instrument panel of a vehicle. The vehicle includes one or more display screens that project rearward of a surface of the instrument panel presented toward the occupants of a passenger of the vehicle. The display screen(s) also extend vertically above an upper surface of the instrument panel. The passenger airbag module includes an airbag configured to deploy between the display screen and the occupants in order to help protect the occupants from impacts with the display screen(s) and/or the instrument panel. To ensure that the airbag is positioned between the display screen and the occupants, it is configured so that its deployment trajectory avoids its contacting a rear portion of the display screen.

According to one aspect, an apparatus helps to protect an occupant of a seat of a vehicle including an instrument panel and a display screen that is positioned rearward of an occupant facing surface of the instrument panel and that extends vertically above an upper surface of the instrument panel. The apparatus includes an airbag configured to have a stored condition in which the airbag is rolled and/or folded and positioned within the instrument panel at a location below the display screen. The airbag is configured to inflate and deploy from the instrument panel in response to receiving inflation fluid from an inflation fluid source. The airbag is configured to deploy in an upward direction through a space between the occupant and the instrument panel to a position in which the airbag is positioned between the display screen and the occupant.

According to another aspect, the airbag can include a throat configured to extend when inflated along the instrument panel below the display screen and a cushion configured to extend, when inflated, upward from the throat to a position between the occupant and the instrument panel and the display screen.

According to another aspect, the throat can be configured to be positioned between the occupant's legs and the instrument panel and to help protect the occupant's legs from impacts with the instrument panel.

According to another aspect, the throat can be configured to be positioned between the occupant's legs and the display screen and to help protect the occupant's legs from impacts with the display screen.

According to another aspect, the apparatus can include throat tethers that interconnect airbag panels forming the throat. The throat tethers can be configured to help control the inflated thickness of the throat and to help control the deployment trajectory of the airbag so that the airbag deploys along the instrument panel through the space between the occupant's legs and the instrument panel and display screen.

According to another aspect, the throat and cushion can be rolled and/or folded separately to place the airbag in the stored condition. The throat can be configured to receive inflation fluid first and to deploy in response thereto, carrying the substantially uninflated cushion through the space between the occupant's legs and the instrument panel. The cushion can be configured to inflate and deploy once it substantially clears the space between the occupant's legs and the instrument panel.

According to another aspect, the throat can be configured to deploy linearly along the instrument panel through the space between the instrument panel and the occupant's legs, carrying with it the cushion portion.

According to another aspect, the cushion can be configured to unroll and/or unfold onto and along the instrument panel and display screen.

According to another aspect, the airbag can include a hooked portion at an upper end of the cushion. The hooked portion can have a curved configuration that defines a hook space for receiving an upper portion of the display screen.

According to another aspect, a terminal end of the hooked portion can be configured to occupy a space to the rear of the display screen between the display screen and the instrument panel.

According to another aspect, a terminal end of the hooked portion can be configured to support the display screen on the instrument panel against forces exerted on it by an impacting occupant.

According to another aspect, the apparatus can also include hook tethers that interconnect airbag panels to help define the hooked portion and enforce the curvature of the hooked portion.

According to another aspect, the airbag can be configured to be stored in the instrument panel in the area of a footwell of the vehicle.

According to another aspect, the apparatus can form a component of an airbag module, which can also include an inflator for inflating the airbag and a housing for storing the airbag in the stored condition.

According to another aspect, the housing can be configured to be mounted in the instrument panel in the area of a footwell of the vehicle.

According to another aspect, the housing can be configured to be mounted at a front row center seating position in the vehicle.

According to another aspect, the housing can be configured to be mounted at a front row passenger side seating position in the vehicle.

According to another aspect, the airbag module can be a component of a vehicle safety system that also includes a controller for actuating the inflator in response to detecting the occurrence of an event for which occupant protection is desired.

BRIEF DESCRIPTION OF THE DRAWINGS

The foregoing and other features will become apparent to one skilled in the art to which this disclosure relates upon consideration of the following description with reference to the accompanying drawings, in which:

FIG. 3 is a side view illustrating a center or passenger side front seat occupant of the vehicle of FIG. 1, along with a deployed frontal airbag that forms a portion of the airbag module, according to one example configuration.

FIGS. 4A-C are schematic views illustrating a method in which the airbag can be placed in a stored condition.

DETAILED DESCRIPTION

Figure 1:
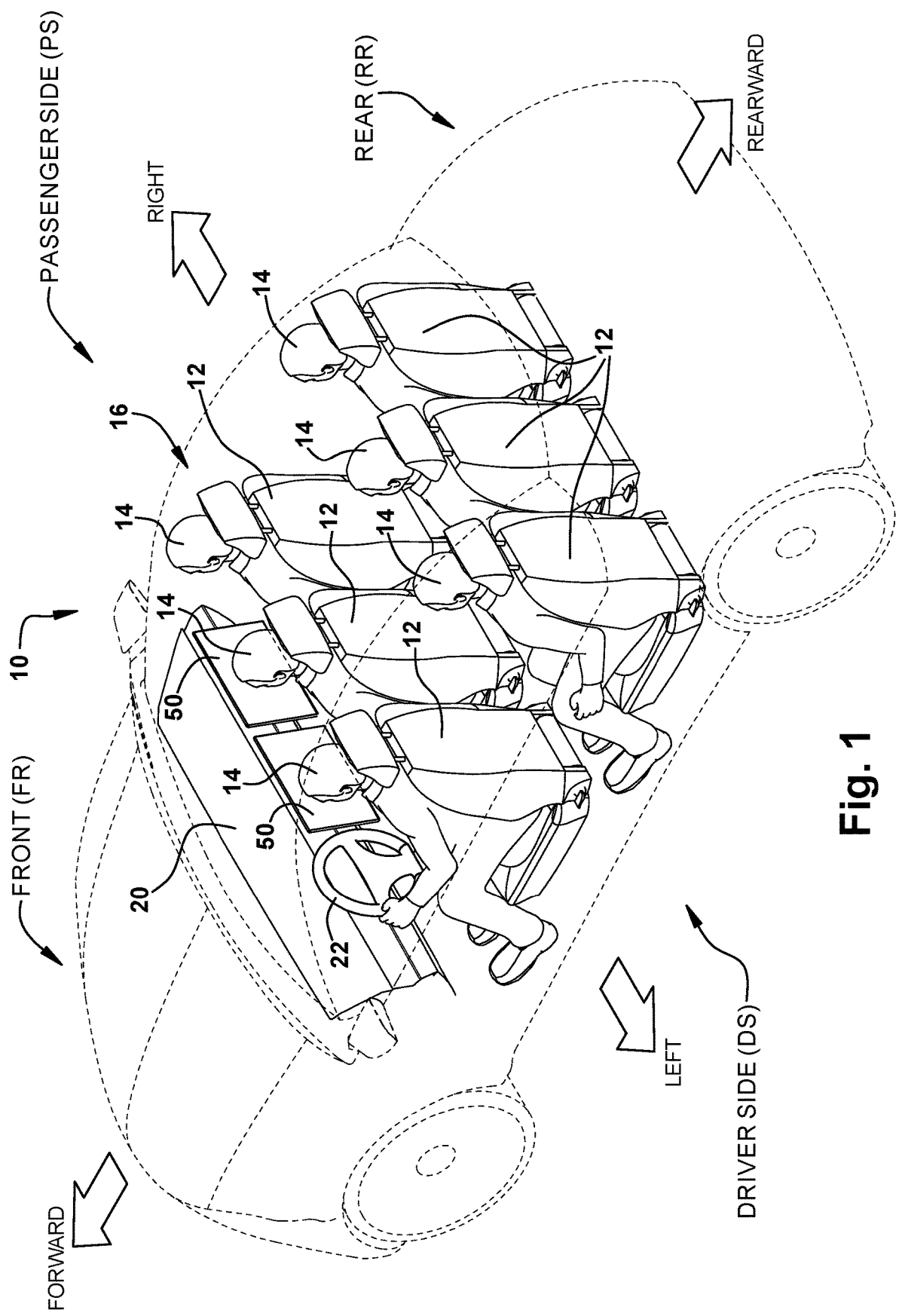
FIG. 1 is a perspective view depicting a vehicle including passengers-occupying vehicle seats, according to an example configuration.

FIG. 1 illustrates a vehicle 10 that includes that includes seats 12 for supporting occupants 14 in a passenger cabin 16. For purposes of clarity, FIG. 1 illustrates directions by way of arrows, which indicate forward, rearward, left, and right. In this description, when reference to direction is made, it is done so with reference to the directions indicated in FIG. 1. Therefore, references to forward or a forward direction is forward in the vehicle, i.e., toward the front FR of the vehicle, as indicated by the arrow labeled FORWARD. References to rearward or a rearward direction is rearward in the vehicle, i.e., toward the rear RR of the vehicle, as indicated by the arrow labeled REARWARD. References to "left" or "left side" is to the left as viewed facing forward in the vehicle, i.e., toward or on the driver side DS of the vehicle, as indicated by the arrow labeled LEFT. References to "right" or "right side" is to the right as viewed facing forward in the vehicle, i.e., toward or on the passenger side PS of the vehicle, as indicated by the arrow labeled RIGHT.

There are, of course, some countries/locations, such as England, where the driver and passenger side identities are switched or reversed. The vehicle safety system disclosed herein is not limited to driver side=left side vehicle implementations. The descriptions and illustrations herein are equally applicable to those vehicle configurations, with a mirror imaged implementation. Thus, for example, "driver side" as used herein would refer to the right side of the vehicle, and "passenger side" would refer to the left.

As shown in FIG. 1, the vehicle 10 includes two rows of vehicle seats 12, i.e., a first or front row, and a second or rear row. The vehicle 10 could, however, include any number of seating rows, such as a single row or three or more rows. Additionally, in FIG. 1, each row of seats 12 is configured to accommodate three occupants 14, i.e., a driver side occupant, a passenger side occupant, and a center occupant. The vehicle 10 could, however, be configured so that each row of seats 12 accommodates fewer occupants 14, e.g., two occupants, or more than three occupants.

Figure 2:
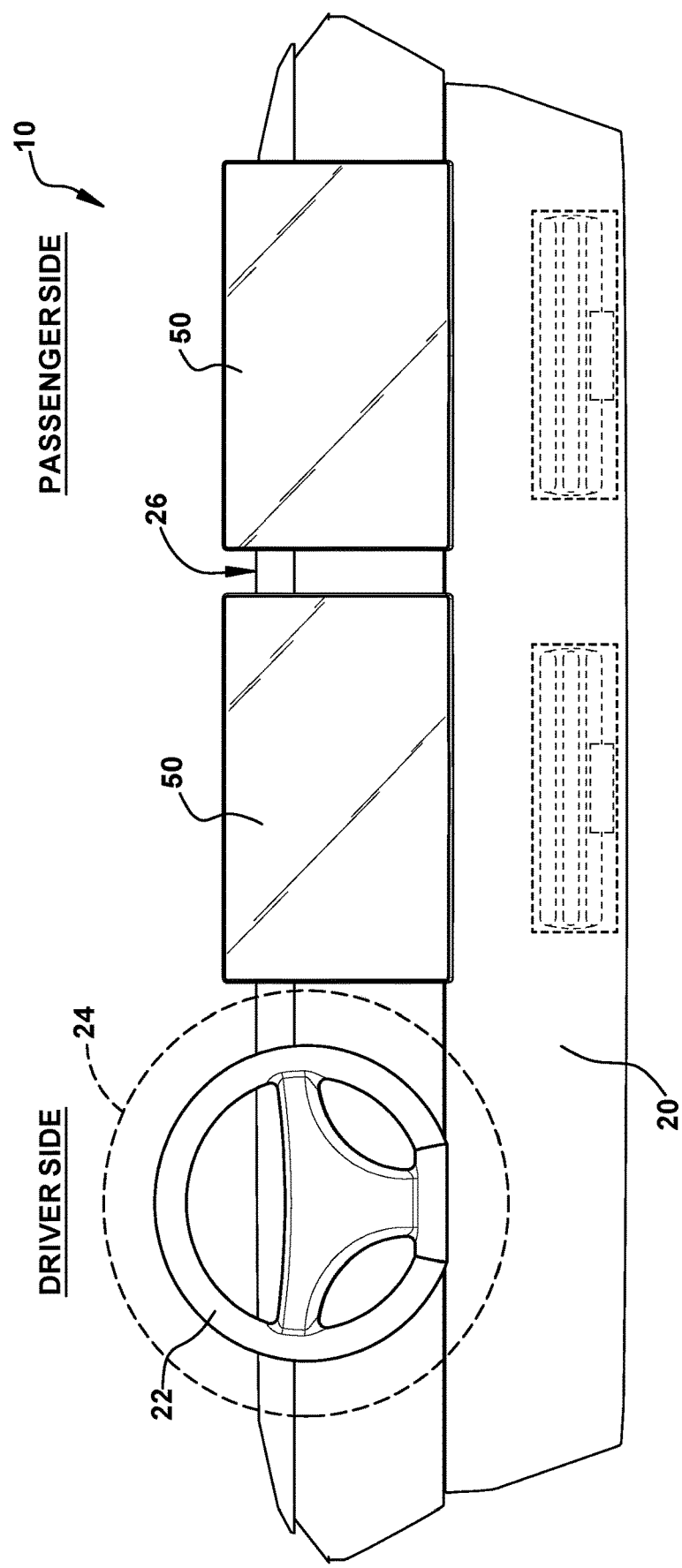
FIG. 2 is a plan view illustrating an instrument panel, including a steering wheel, display screens, and an instrument panel mounted airbag module, according to the example configuration of FIG. 1.

Referring to FIGS. 1 and 2, the vehicle 10 includes an instrument panel 20 that extends the width of the vehicle in front of the first row seats 12 and any occupants 14 of those seats. A Steering wheel 22 is positioned on the driver side of the vehicle 10 and is presented toward the occupant 14 of the driver side seat 12. The steering wheel 22 can house a traditional driver airbag, which is shown generally in dashed lines at 24. The instrument panel 20 traditionally has held instrumentation, such as gauge clusters, and operator controls, such as knobs, switches, etc., for controlling the vehicle 10 and its auxiliary features. For the vehicle of FIGS. 1 and 2, the instrument panel 20 includes interactive display screens 50, referred to herein alternatively as "display screens," "displays," or "screens," that can take the place of many or all of the traditional instrument panel mounted operator controls.

The display screens 50 can be used to access and control vehicle systems such as those listed below. This list is by way of example and is not meant to be exhaustive:

Vehicle Entertainment Systems:
    Broadcast Radio
    Satellite Radio
    Internet Radio Streaming Services, such as Apple Play®, Android Auto®, Spotify®, Amazon Music®, podcasts, etc.
Streaming Video
Internet Access
Climate Controls:
Cabin Heat & Air Conditioning
Heated/Cooled Seats
Heated Steering Wheel
Vehicle Navigation System
Driving Modes:
Economy, Sport, Off-Road, Snow, Rain, etc.
Tow/Haul Mode
Cruise Control
Adaptive Cruise
Communication Systems:
Telephone
Emergency Roadside Assistance
Auxiliary Controls:
Windows/Sunroof/Moonroof
Exterior Lighting
Interior Lighting
Wiper Controls/Settings
Seat Position and Memory
Door Locks/Auto-lock Settings As shown in FIGS. 1 and 2, there are two display screens 50—one that is center mounted and one mounted on the passenger side of the instrument panel 20. The center mounted display screen 50 can be configured to be reached by the occupant 14 of any seating position in the front row, i.e., the driver side seat, the passenger side seat, or the center seat. The passenger side mounted display screen 50 can be configured to be accessed by an occupant of the center seat or the passenger seat. The passenger side display screen 50 can be optional, i.e., the vehicle 10 might include only a center display screen 50. Because the display screens 50 take over, to a large extent, the operator control interface functions of conventional instrument panel located controls, the screens can be very large, i.e., up to 21-inches diagonal or more.

FIG. 3 shows a side view of the vehicle 10 in which the occupant 14 is seated, as viewed from the passenger side of the vehicle. The side view of FIG. 3 can therefore be that of a passenger side seated occupant 14 or a center seated occupant. As shown in FIG. 3, the display screen 50 is positioned away from the instrument panel 20, extending rearward toward the occupant 14 and upward above an upper surface 26 of the instrument panel.

The vehicle cabin 16 is defined, at least partially, by the vehicle roof 30, windshield 32, and floor 34. Within the confines of the cabin 16, the configurations of the instrument panel 20 and display screen 50, in combination with the position of the seat 12 and the size of the occupant 14, help define the space or area within which vehicle safety system components, such as inflatable restraints, such as airbags, inflatable knee bolsters, and lower leg airbags, can be deployed. Because the display screens 50 are so large and prominently positioned to extend above and rearward into the cabin 16, addressing vehicle safety needs to take these factors into consideration.

Accordingly, the vehicle 10 includes a vehicle safety system 60, which includes an airbag module 62 that is mounted at an area of the instrument panel 20 proximate a footwell 40, which is defined between a lower surface 42 of the instrument panel and the vehicle floor 34. The airbag module 62 includes a housing 68 which supports an inflator 70 and a frontal airbag 80, which is shown in a stored condition in dashed lines and in a deployed condition in solid lines. The safety system 60 also includes a controller 64, such as an airbag controller, that is configured to actuate the inflator 70 via wiring 66 to inflate and deploy the airbag 80 in response to sensing the occurrence of an event, such as a vehicle crash, for which occupant protection is desired.

The presence of the display screen 50 presents a challenge in providing frontal occupant protection via the airbag 80. Typically, passenger frontal airbags are stored in an upper portion 36 of the instrument panel 20 and deploy from an upper portion of the instrument panel, at or near the upper surface 26. Because, however, the display screen 50 extends above the upper surface 26 and rearward toward the occupant 14, deploying an airbag from the traditional location in the upper portion 36 of the instrument panel 20 becomes problematic. This is because the deploying airbag can engage the display screen 50, which can cause problems, such as damage to the airbag and/or launching the display screen in the vehicle cabin 16, creating the potential for striking the occupant 14.

Advantageously, the vehicle safety system 60 is configured to avoid these issues. To do so, the airbag module 62 is mounted in a lower portion 38 of the instrument panel 20 in an area adjacent or near the footwell 40. The airbag 80 includes a throat or throat portion 82 and a cushion or cushion portion 84. The throat 82 is fluidly connected to the inflator 70 within the airbag housing 68, exits the instrument panel 20, and extends through the narrow space 72 between the occupant's legs 18 and the instrument panel/display screen 50. The throat 82 can therefore cushion the occupant's legs 18 from impacts with the instrument panel 20 and/or the display screen 50.

The cushion 84 is fluidly connected to the throat 82 and extends from the throat upward from the occupant's legs 18 to the illustrated deployed position in front of the occupant 14. In the inflated and deployed position, the cushion is positioned in the space 72 between the occupant 14 and the instrument panel 20 and covers the display screen 50. The cushion portion can therefore cushion the occupant 14 from impacts with the instrument panel 20 and/or the display screen 50.

As shown in the example configuration of FIG. 3, the throat 82 can include one or more internal throat tethers 86 that interconnect portions of the throat. The throat tethers 86 help control the inflated configuration of the throat 82, i.e., its overall dimensions and the spacing between its walls. The throat tethers 86 also help control the deployment direction, i.e., the trajectory along which the throat 82 specifically, and the airbag 80 in general, moves when deployed from the airbag housing 68.

Because the space 72 between the occupant's legs 18 and the instrument panel 20/display screen 50 is narrow, the airbag 80 includes features designed to cause it to deploy through this limited space. The throat tethers 86 help control the shape and size of the throat 82 so that it fits within this space 72. Also, the throat tethers 86 help control the deployment trajectory of the airbag 80, so that the cushion 84 passes through and clears the space 72 prior to inflating and deploying upward between the occupant 14 and the instrument panel 20 and display screen 50. Further, the throat tethers 86, in combination with the shape of the airbag panels forming the throat 82, cause the throat to be biased toward and against instrument panel 20 when the airbag 80 is inflated and pressurized.

As a result of this configuration, the cushion 84 is configured to pass through the space 72 in a substantially uninflated manner, carried by the deploying throat 82. Once it clears the space 72, the cushion 84 inflates and deploys upward to the position illustrated in FIG. 3. The inflated cushion 84 occupies the space between the occupant's upper body and the instrument panel 20 and display screen 50, thus helping to protect the occupant 14 from impacts with those structures.

To promote inflation and deployment of the airbag 80 in this manner, the airbag additionally can be placed in the stored condition in the airbag housing 68 in a manner designed to promote the inflation and deployment described above. An example of this is shown in FIGS. 4A-4C. FIG. 4A illustrates the airbag 80 in profile, in its natural state, with its panel(s) and tethers 86 having been stitched together or otherwise assembled.

The airbag 80 includes a front panel 90 presented facing the occupant 14 and a rear panel 92 presented facing the instrument panel 20 and display screen. The panels 90, 92 extend along both the throat 82 and the cushion 84 and help define an inflatable volume of the airbag 80. As shown, the tethers 86 interconnect the front and rear panels 90, 92 along the throat 82.

The airbag 80 can be formed in a variety of manners. For example, the airbag 80 can have a one piece woven (OPW) construction in which yarns (e.g., nylon yarns) are woven simultaneously to form both the one-layer portions where the panels 90, 92 are interconnected, and two-layer portions where the panels are separate. As another example, the airbag 80 can be formed from separately woven panels that are interconnected, for example, by stitching, ultrasonic welding, heat bonding, or adhesives.

Regardless of the construction, the airbag 80 can be coated with a gas impermeable material, such as urethane, or laminated with a gas impermeable film. The airbag 80 thus can have a substantially gas-tight construction. Those skilled in the art will appreciate that alternative materials, such as polyester yarn, and alternative coatings, such as silicone, can also be used to construct the airbag 80.

As shown in FIG. 4B, the initial step in placing the airbag 80 in the stored condition is to flatten it depth-wise, e.g., by bringing the front and rear panels 90, 92 together, flat against each other. The flattened airbag 80 can then be folded and/or rolled and placed in the airbag housing 68. To maintain the airbag 80 in this rolled/folded condition, a fabric cover (not shown) can be used to envelop and package the airbag. The deflated and stowed condition of the airbag 80 in the airbag housing 68 can thus be referred to as the airbag being "packaged" in the airbag module 62.

One example method for packaging the airbag 80 is illustrated in FIGS. 4B-4C. As indicated in FIG. 4B, the flattened cushion 84 can be rolled-up in the direction indicated generally by the arrow labeled A. the flattened throat 82 can be accordion folded back and forth, as indicated by the arrows labeled B. As a result, the airbag 80 is placed in the condition shown in FIG. 4C, with the throat 82 accordion folded and the cushion 84 spirally rolled. When packaging the airbag 80 in the airbag housing 68, the folded throat 82 and rolled cushion 84 can be folded/rolled more tightly than shown so as to fit the airbag within the confines of the housing.

The manner in which the airbag 80 is rolled/folded to package it in the airbag module 62 can be chosen in order to affect the manner in which it deploys. For instance, the throat 82, being connected to the inflator 70 will receive inflation fluid first when the airbag 80 is deployed. The accordion fold can be configured to unfold and deploy in a generally axial direction, as indicated generally by the arrow labeled C in FIG. 4C. The airbag module 62 can be configured so that this axial direction of unfolding and deployment, in combination with the configurations of the throat tethers 86, controls the deployment trajectory of the throat 82 so that it deploys through the space 72, while carrying with it the uninflated/substantially uninflated cushion 84.

The cushion 84 begins to inflate after having been moved at least into, if not through the space 72 between the occupant 14 and the instrument panel 20. The cushion 84 will, of course, unroll as it inflates in a direction opposite of that in which it was rolled-up, as indicated generally by the arrow labeled D in FIG. 4C. Viewing this unrolling direction in conjunction with the airbag placement/positioning shown in FIG. 3, it can be seen that the unrolling direction is forward in the vehicle, away from the occupant 14 and toward the instrument panel 20. Even if the occupant 14 is positioned close to the unrolling cushion 84, it will tend to unroll along/over the occupant, as opposed to frictionally engaging, i.e., rubbing along the occupant.

The airbag 80 could, of course, be placed in the stored, packaged condition in a different manner. For example, the cushion 84 could be roll-folded, which means that the cushion is folded over repeatedly in the same direction, i.e., a roll-fold direction. The result of a roll-folded configuration is therefore one of flattened folds as opposed to the circular roll shown in FIG. 4C. As another example, the cushion 84 could be rolled in a direction that is opposite that shown in FIGS. 4B-4C. This might be done, for example, so that the cushion 84 rolls over the display screen 50, as opposed to frictionally engaging, i.e., rubbing against the display screen, in order to help prevent the cushion from grabbing and potentially breaking the screen away from the instrument panel 20.

The ideal rolling/folding method or combination of methods can depend on the architecture of the particular vehicle platform in which the vehicle safety system 60 is being implemented. For example, the vehicle 10 illustrated in FIG. 3 includes an instrument panel 20 that allows for the airbag 80 to exit the airbag housing 68 along a trajectory that aligns longitudinally with the space 72 between the occupant 14 and the instrument panel 20. This might not be the case for all vehicles. For example, a vehicle (not shown) might be configured such that the airbag must exit the airbag housing more in the direction of the footwell 40. In this case, it might be necessary or desirable to implement a roll or roll-fold of the throat 82 in order to help direct it through the space 72 between the occupant 14 and the instrument panel 20.

Figure 5:
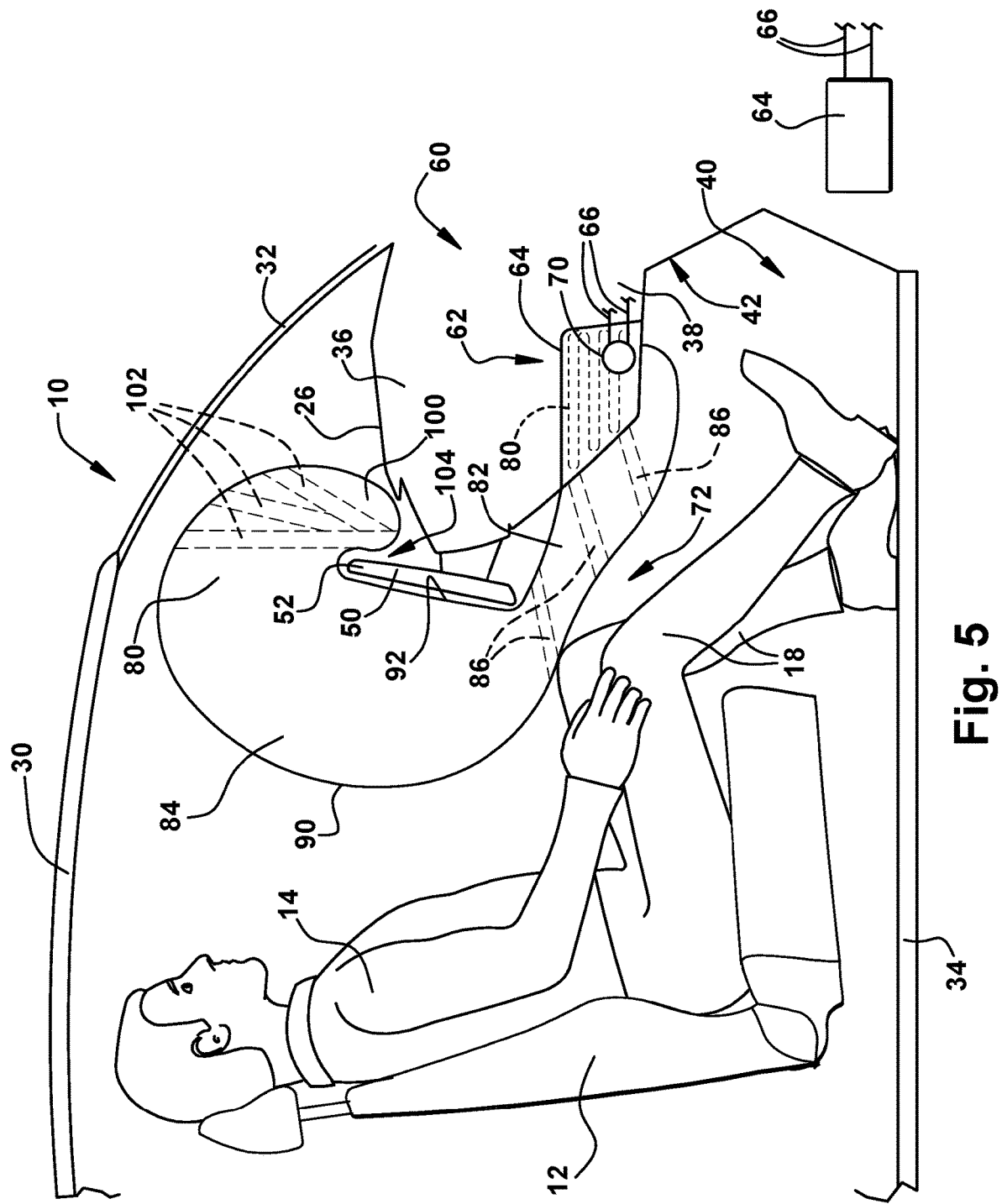
FIG. 5 is a side view illustrating a center or passenger side front seat occupant of the vehicle of FIG. 1, along with a deployed frontal airbag that forms a portion of the airbag module, according to another example configuration.

Another example configuration of the vehicle safety system 60, including the airbag 80, is shown in FIG. 5. The vehicle safety system 60 of FIG. 5 is similar in some respects, and identical in others, to the example configuration the vehicle safety system of FIG. 3. The differences between the systems of FIGS. 3 and 5 are differences in the configuration/construction of the airbag 80. For these reasons, FIG. 5 utilizes reference numbers that are identical to those in FIG. 3 to refer to elements that are similar or identical between these two example configurations. Accordingly, reference numbers shown in FIG. 5 that are not explicitly discussed with reference to FIG. 5 can be presumed to identify elements in FIG. 5 that are similar or identical to those of corresponding elements in FIG. 3. In this case, the description with reference to FIG. 3 applies also to FIG. 5.

As shown in FIG. 5, the cushion 84 of the airbag 80 includes an upper hooked portion 100 configured to curve and extend or wrap around the upper portion 52 of the display screen 50. To enforce the curved configuration of the hooked portion 100, the airbag can include hook tethers 102 that restrict relative movement of the airbag panels. The hooked portion 100 defines a hook space 104 for receiving the upper portion 52 of the display screen 50.

In extending around and behind the upper portion of the display screen 50, the hooked portion 100 performs several functions. First, it helps protect the occupant 14 from impacts with the upper portion 52 of the display screen 50 and the edges thereof. Extending around the display screen 50, the hooked portion 100 helps the cushion 84 envelop and contain the screen, should it break off or otherwise become dislodged from the instrument panel 20. Finally, the hooked portion 100 can help fill the space 54 behind the display screen 50, between the screen and the instrument panel. In this manner, the hooked portion 100 can help support the display screen 50 against forces urged upon it by the occupant 14 penetrating into the cushion 84. In this manner, the cushion 84, through the function of the hooked portion 100, can help prevent damage to the display screen 50 while, at the same time, protecting the occupant 14.

Figure 6:
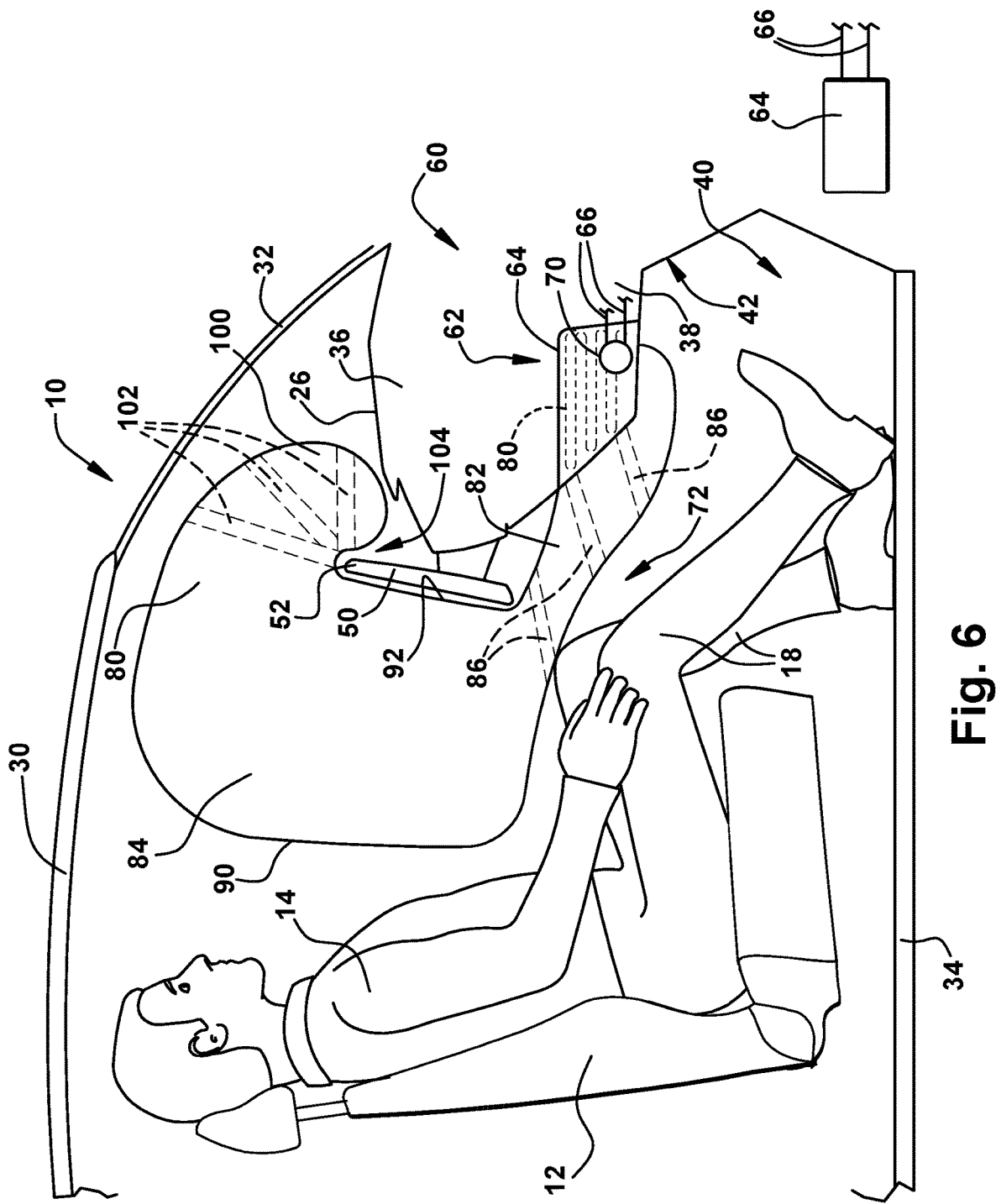
FIG. 6 is a side view illustrating a center or passenger side front seat occupant of the vehicle of FIG. 1, along with a deployed frontal airbag that forms a portion of the airbag module, according to a further example configuration.

Another example configuration of the vehicle safety system 60, including the airbag 80, is shown in FIG. 6. The vehicle safety system 60 of FIG. 6 is similar in some respects, and identical in others, to the example configurations of the vehicle safety system of FIGS. 3 and 5. The differences between these are differences in the configuration/construction of the airbag 80. For these reasons, FIG. 6 utilizes reference numbers that are identical to those used in FIGS. 3 and 5 to refer to elements that are similar or identical between these example configurations. Accordingly, reference numbers shown in FIG. 6 that are not explicitly discussed with reference to FIG. 6 can be presumed to identify elements in FIG. 6 that are similar or identical to those of corresponding elements in FIGS. 3 and 5. In this case, the description with reference to FIGS. 3 and 5 apply also to FIG. 6.

As shown in FIG. 6, the cushion 84 of the airbag 80 includes an upper hooked portion 100 configured to curve and extend or wrap around the upper portion 52 of the display screen 50. To enforce the curved configuration of the hooked portion 100, the airbag can include hook tethers 102 that restrict relative movement of the airbag panels. The hooked portion 102 defines a hook space 104 for receiving the upper portion 52 of the display screen 50.

The configuration of the hooked portion is similar or identical in function to that of the configuration shown in, and described with reference to, FIG. 5. Thus, in extending around and behind the upper portion 52 of the display screen 50, the hooked portion 100 of FIG. 6 also performs several functions. First, it helps protect the occupant 14 from impacts with the upper portion 50 of the display screen 50 and the edges thereof. Extending around the display screen 50, the hooked portion 100 helps the cushion 84 envelop and contain the screen, should it break off or otherwise become dislodged from the instrument panel 20. Finally, the hooked portion 100 can help fill the space 102 behind the display screen 50, between the screen and the instrument panel. In this manner, the hooked portion 100 can help support the display screen 50 against forces urged upon it by the occupant 14 penetrating into the cushion 84. In this manner, the cushion 84, through the function of the hooked portion 100, can help prevent damage to the display screen 50 while, at the same time, protecting the occupant 14.

Additionally, the cushion 84 of the airbag 80 shown in FIG. 6 is configured to fill a greater volume of the space between the occupant 14 and the instrument panel 20 and display screen 50. In this manner, the degree of cushioning afforded to an impacting occupant 14 can be increased or optimized. Of course, filling a greater volume requires an increase in both volume and flow rate of inflation fluid into the airbag 80. The increased volume of the cushion 84 therefore has to be balanced with not only the need to deploy the airbag 80 within a sufficient time after detecting a crash, but also to do so with consideration of the somewhat unique deployment issues presented by the display screen e.g., deploying through the narrow space 72 between the occupant 14 and instrument panel 20, and enveloping, containing, or otherwise preventing the display screen from impacting the occupant or being impacted by the occupant. Therefore, these considerations and concerns, along with the vehicle architecture, are taken into account when configuring and sizing the airbag 80 and inflator 70.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect an occupant of a seat of a vehicle including an instrument panel and a display screen that is positioned rearward of an occupant facing surface of the instrument panel and that extends vertically above an upper surface of the instrument panel, the apparatus comprising:
   an airbag configured to have a stored condition in which the airbag is rolled and/or folded and positioned within the instrument panel at a location below the display screen;
   wherein the airbag is configured to inflate and deploy from the instrument panel in response to receiving inflation fluid from an inflation fluid source, the airbag being configured to deploy in an upward direction through a space between the occupant and the instrument panel to a position in which the airbag is positioned between the display screen and the occupant,
   wherein the airbag comprises a hooked portion at an upper end of the cushion, the hooked portion having a curved configuration that defines a hook space for receiving an upper portion of the display screen, a terminal end of the hooked portion being configured to occupy a space to the rear of the display screen between the display screen and the instrument panel and being configured to support the display screen on the instrument panel against forces exerted on it by an impacting occupant.

2. The apparatus recited in claim 1, wherein the airbag comprises a throat configured to extend when inflated along the instrument panel below the display screen, and a cushion configured to extend when inflated upward from the throat to a position between the occupant and the instrument panel and the display screen.

3. The apparatus recited in claim 2, wherein the throat is configured to be positioned between the occupant's legs and the instrument panel and to help protect the occupant's legs from impacts with the instrument panel.

4. The apparatus recited in claim 3, wherein the throat is configured to be positioned between the occupant's legs and the display screen and to help protect the occupant's legs from impacts with the display screen.

5. The apparatus recited in claim 2, further comprising throat tethers that interconnect airbag panels forming the throat, the throat tethers being configured to help control the inflated thickness of the throat and to help control the deployment trajectory of the airbag so that the airbag deploys along the instrument panel through the space between the occupant's legs and the instrument panel and display screen.

6. The apparatus recited in claim 2, wherein the throat and cushion are rolled and/or folded separately to place the airbag in the stored condition, the throat being configured to receive inflation fluid first and to deploy in response thereto, carrying the substantially uninflated cushion through the space between the occupant's legs and the instrument panel, the cushion being configured to inflate and deploy once it substantially clears the space between the occupant's legs and the instrument panel.

7. The apparatus recited in claim 6, wherein the throat is configured to deploy linearly along the instrument panel through the space between the instrument panel and the occupant's legs, carrying with it the cushion portion.

8. The apparatus recited in claim 6, wherein the cushion is configured to unroll and/or unfold onto and along the instrument panel and display screen.

9. The apparatus recited in claim 1, further comprising hook tethers that interconnect airbag panels to help define the hooked portion and enforce the curvature of the hooked portion.

10. The apparatus recited in claim 1, wherein the airbag is configured to be stored in the instrument panel in the area of a footwell of the vehicle.

11. An airbag module comprising the apparatus recited in claim 1, an inflator for inflating the airbag, and a housing for storing the airbag in the stored condition.

12. The airbag module recited in claim 11, wherein the housing is configured to be mounted in the instrument panel in the area of a footwell of the vehicle.

13. The airbag module recited in claim 11, wherein the housing is configured to be mounted at a front row center seating position in the vehicle.

14. The airbag module recited in claim 11, wherein the housing is configured to be mounted at a front row passenger side seating position in the vehicle.

15. A vehicle safety system comprising the airbag module recited in claim 11 and a controller for actuating the inflator in response to detecting the occurrence of an event for which occupant protection is desired.

* * * * *